April 29, 1930.  R. PEARSON  1,756,567
CHECK VALVE
Filed Jan. 3, 1928
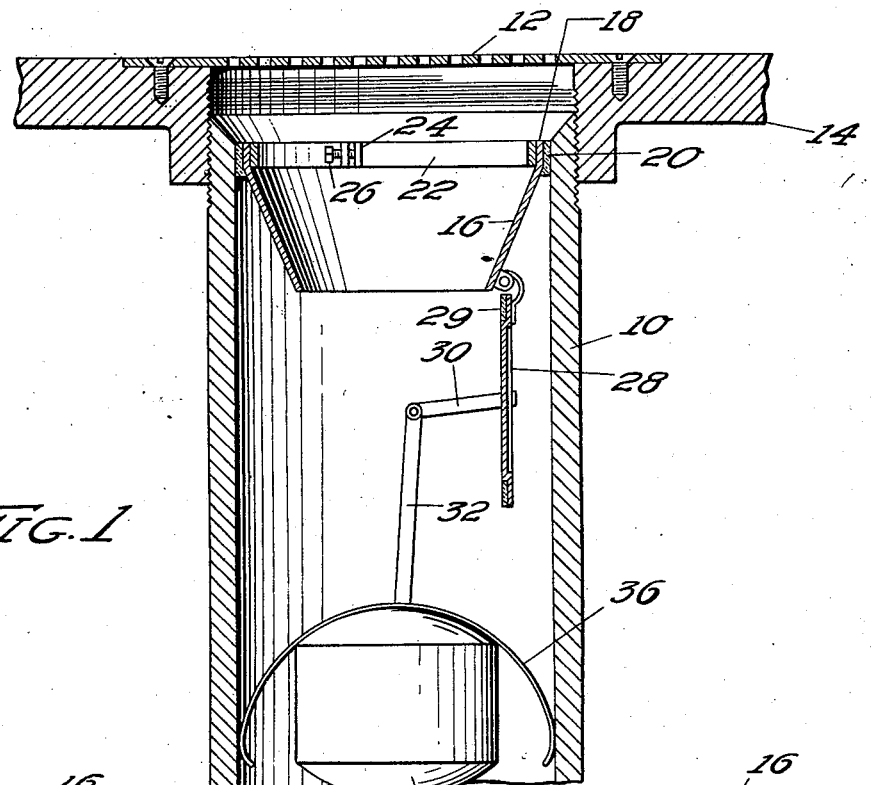
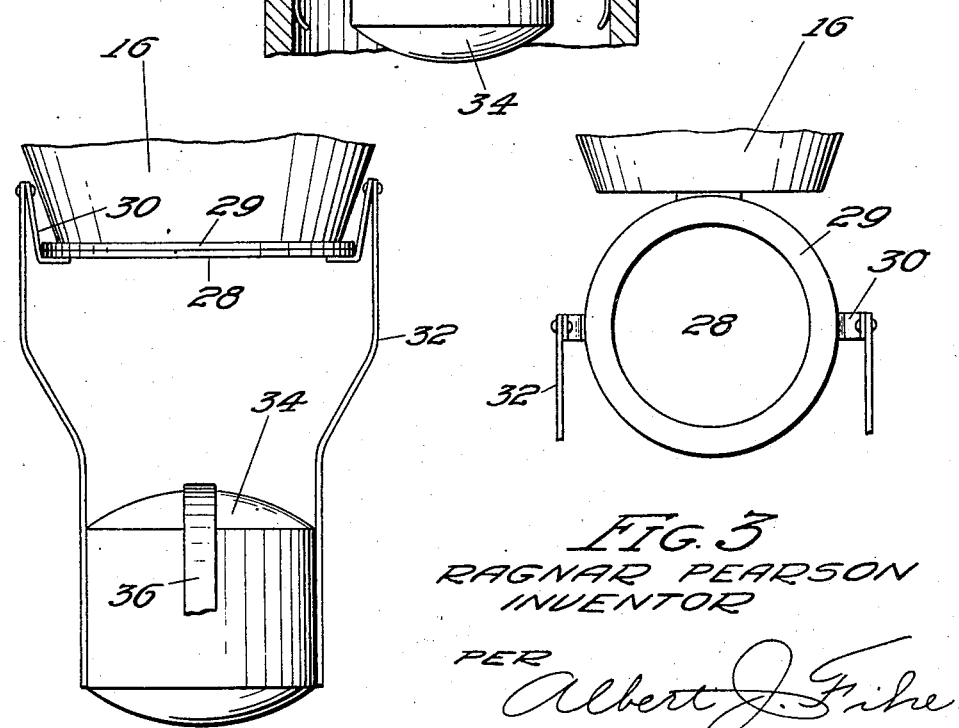
RAGNAR PEARSON
INVENTOR
PER Albert J. Fihe
ATTORNEY Patented Apr. 29, 1930

1,756,567

UNITED STATES PATENT OFFICE

RAGNAR PEARSON, OF CHICAGO, ILLINOIS

CHECK VALVE

Application filed January 3, 1928. Serial No. 244,212.

This invention relates to improvements in a check valve, and has for one of its principal objects the provision of a valve adapted to be placed in a drain pipe which will, in the event of backing up of sewage, automatically close, preventing overflowing of liquids above the drain levels.

One of the important objects of this invention is to provide in a drain or check valve a simple, yet effective valve of durable construction arranged to be automatically operated to close the inlet of a sewer drain or the like in the event of backing up or overflow of the water in the drain.

A further important object of the invention is the provision in a drain valve, of means for preventing the clogging of the closing member, or gate of the valve by solid matter which enters the inlet of the drain, and the consequential imperfect seating of the gate, which results in leakage past the valve, in the event of backing up of sewage. This is a highly important feature of this invention, especially in floor drains and the like, as a certain amount of dust and dirt is always entering the drain, regardless of the type of grating used to cover the entrance.

Other and still further important objects of the invention will be apparent from the disclosures in the accompanying drawings and following specification.

The invention in a preferred form is shown in the drawings and hereinafter more fully described.

In the drawings:

Figure 1 is a vertical view, partly in section, showing the improved check valve of this invention applied to a drain pipe.

Figure 2 is a detail view of the float and gate in closed position.

Figure 3 is a detail view, illustrating the gate.

As shown in the drawings:

The reference numeral 10 indicates generally a drain pipe or the like fitted with a grating 12 and mounted in the usual drain cap 14.

In order to prevent the backing up of sewage in the drain pipe under undue pressure from outside sources, the valve of this invention is applied to the pipe 10 in the form of an annular member 16 preferably shaped in the form of a frustrum of an inverted cone as shown, and having its upper edge adapted to be closely fitted into the interior of the upper end of the pipe 10.

The upper edge of the annular member 16 is formed vertically as best illustrated at 18 in Figure 1, and is adapted to be fitted into a supporting gasket 20, formed of rubber or other suitable material and positioned inside the pipe 10 as shown in Figure 1.

In order to maintain a close liquid-tight fit between the member 18, the gasket 20, and the interior edge of the pipe 10, an expansion ring 22 is fitted inside the element 18 and passing substantially completely therearound, and having two inwardly turned adjacent ends 24, into one of which is fitted a screw or threaded bolt 26, the end of which abuts against the corresponding other end 24 of the ring 22. It will be obvious that a tightening of the bolt 26 against the member 24 will operate to spread the ring 22 and the member 18, which is provided with a plurality of vertical slots to facilitate the spreading of the same, thereby effecting a very close and liquid-tight fit between these elements, the gasket 20 and the interior of the pipe 10.

Hingedly attached to the lower edge of the cone shaped element 16 is a circular disc or gate 28, adapted to close the lower opening of the annular element 16 when the back water rises in the pipe 10. A rubber ring 29 is mounted on the face of the gate to insure more perfect contact when the gate is seated. Rigidly attached to the gate 28 and diametrically opposite each other are two links 30 extending substantially at right-angles to the plane of the disc. Pivotally connected to the ends of the links 30 and depending therefrom are two additional links 32, rigidly attached between the lower portions of which is an air-tight hollow float 34.

It is obvious that when water rises in the pipe 10, the valve elements, which are normally in the position shown in Figure 1, will assume the position shown in Figure 2, thereby closing the disc or gate 28 upon the opening of the annular member 16.

An element 36 rigidly attached to the float 34 is merely for the purpose of securing the motion of the float along the axis of the pipe 10.

It is apparent that herein is provided a check valve which besides being automatic and convenient in its operation, is composed of a minimum of parts and is simple of construction, thereby being economically manufactured and practically impossible to get out of order. Further, the greatest disadvantage encountered in drain valves heretofore used, namely, the clogging of the seating element, due to dirt and the like settling upon it, is overcome, for normally the seating element or gate in this invention is placed in such a position that it will not accumulate such clogging matter.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a drain valve for a sewer pipe, an annular member adapted to be fitted into the interior of the upper end of the pipe, a gate hingedly attached to the lower end of the annular member, a float within the pipe and link means of connection between the gate and the float, and spring guide means for maintaining the direction of motion of the float vertically along the vertical axis of the pipe.

2. In a drain valve for a sewer pipe, an annular member adapted to be fitted into the interior of the upper end of the pipe, a gate hingedly attached to the lower end of the annular member, a float within the pipe and link means of connection between the gate and the float, and means for maintaining the direction of motion of the float vertically along the vertical axis of the pipe, said means comprising a spring guide rigidly attached to the said float.

3. In a sewer check, a tubular body adapted to fit within a sewer pipe, a head for the upper end of said body formed with an opening, a depending wall surrounding the opening and constituting a valve seat, a valve in said body pivotally connected with said head at one side of the opening and adapted to be swung upwardly into contact with the valve seat to close the opening, and a float in said body having its upper end connected with said valve, the float serving to move the valve to a closed position when moved upwardly by water rising in the sewer pipe and body.

In testimony whereof I affix my signature.

RAGNAR PEARSON.